United States Patent [19]

Masuda

[11] Patent Number: 5,293,463
[45] Date of Patent: Mar. 8, 1994

[54] IMAGE PROCESSING APPARATUS
[75] Inventor: Shunichi Masuda, Kawasaki, Japan
[73] Assignee: Canon Kabushiki Kaisha, Tokyo, Japan
[21] Appl. No.: 847,267
[22] Filed: Mar. 10, 1992
[30] Foreign Application Priority Data
Mar. 13, 1991 [JP] Japan .................................. 3-048041
[51] Int. Cl.⁵ ............................................ G06F 15/00
[52] U.S. Cl. ...................... 395/101; 395/113
[58] Field of Search .............. 395/101, 115, 116, 110, 395/117, 650, 113; 358/404, 444; 340/797–800; 346/154; 355/206, 207, 209

[56] References Cited
U.S. PATENT DOCUMENTS

| | | | |
|---|---|---|---|
| 4,279,002 | 7/1981 | Rider | 358/257 |
| 4,589,764 | 5/1986 | Tadokoro et al. | 355/14 R |
| 4,607,138 | 8/1986 | Suzuki et al. | 340/800 |
| 4,771,340 | 9/1988 | Notermans | 358/296 |
| 4,786,923 | 11/1988 | Shimizu | 346/140 |
| 4,843,405 | 6/1989 | Morikawa et al. | 346/1.1 |
| 4,933,772 | 6/1990 | Ikenoue et al. | 358/300 |
| 4,941,108 | 7/1990 | Aoyagi et al. | 364/519 |
| 5,036,361 | 7/1991 | Filion et al. | 355/209 |

Primary Examiner—Arthur G. Evans
Attorney, Agent, or Firm—Fitzpatrick, Cella, Harper & Scinto

[57] ABSTRACT

Provided is an image processing apparatus adapted to inform the user of the time that is required to elapse before an image forming command can actually be executed, thereby eliminating any anxiety that the user might otherwise experience. Specifically, there is provided an image processing apparatus for forming an image by analyzing and decoding a received printing signal and then storing the signal in a page memory in the form of code data, and converting the the code data stored in the page memory into a bit image, including a processing-time calculating unit for calculating time, which is required for conversion to the bit image, based upon analysis of the inputted printing signal, and an informing unit for informing a user of the time calculated by the processing-time calculating unit, wherein the processing-time calculating unit further calculates preparation time required for forming the image from the bit image.

18 Claims, 6 Drawing Sheets

| COMMAND | PRINTING POSITION | PARAMETER 1 | PARAMETER 2 |

FIG. 6

IMAGE PROCESSING APPARATUS

BACKGROUND OF THE INVENTION

1. Field of the Invention

This invention relates to an image processing apparatus, such as a laser printer, having an electrophotographic photosensitive element.

2. Description of the Related Art

Owing to their high printing speed, quiet printing operation and excellent printing quality, printers such as laser printers having an electrophotographic photosensitive element have tended to find wider use in recent years in comparison with the conventional impact printers. Though conventional laser printers originally were high in price, costs have been lowered along with a reduction in size and weight, and such printers are now finding much greater use in the office and home.

A problem encountered with laser printers in many cases is that the user, upon pressing a printing starting button on a personal computer or the like, is made to wait a fairly long period of time before printing actually begins. More specifically, even when the printing starting button on a personal computer has been pressed, the printer (the printer machinery) does not operate immediately but begins operating upon passage of a prescribed period of time. This can cause the user to experience some anxiety.

The aforementioned problem is a result of the processing time needed by the image controller within the laser printer and the preparation time of the engine which relies upon electrophotography.

The image controller performs processing for converting code data, which is sent from the personal computer or the like, into a bit image. The requisite processing time differs depending upon the quantity of data sent from the personal computer but presently is on the order of several seconds to several minutes. A conceivable method of curtailing processing time is to raise the processing speed of the CPU which controls the image controller. However, such high-speed CPUs are extremely expensive and therefore are difficult to use in laser printers of the popular type at the present time.

As for the preparation time of the electrophotographic engine, a laser printer employs a thermal fixing device. In cases where the printer is shut down in order to conserve electric power, in many instances the thermal fixing device is turned off or the fixing temperature is set to be lower than that which prevails during operation. Accordingly, even if a print command is transmitted to the engine upon the completion of processing performed by the image controller, the engine will not start until the thermal fixing device attains a prescribed temperature at which fixing is possible. In addition, laser printers employ a motor for the scanning of a polygon mirror, and the printing operation will not be carried out until the motor attains a prescribed rotational speed. Thus, the engine requires a prescribed preparation time and will not operate until this time elapses, even if a start signal is received from the image controller.

SUMMARY OF THE INVENTION

An object of the present invention is to settle the above problems.

Another object of the present invention is to provide an image processing apparatus bringing further facility by informing a delay time from an image forming command to the start of actual printing.

Another object of the present invention is to provide an image processing apparatus.

Another object of the present invention is to provide an image processing apparatus adapted to inform the user of the time that is required to elapse before an image forming command can actually be executed, thereby eliminating any anxiety that the user might otherwise experience.

According to the present invention, the foregoing object is attained by providing an image processing apparatus for forming an image by analyzing and decoding a received printing signal and then storing the signal in a page memory in the form of code data, and converting the the code data stored in the page memory into a bit image, comprising processing time calculating means for calculating time, which is required for conversion to the bit image, based upon analysis of the inputted printing signal, and informing means for informing a user of the time calculated by the processing-time calculating means, wherein the processing time calculating means further calculates preparation time required for forming the image from the bit image.

In accordance with the arrangement of the invention as described above, the user is informed of data processing time and/or printing preparation time based upon the analysis of the printing signal. This eliminates user anxiety.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

[First embodiment]

Figure 1:
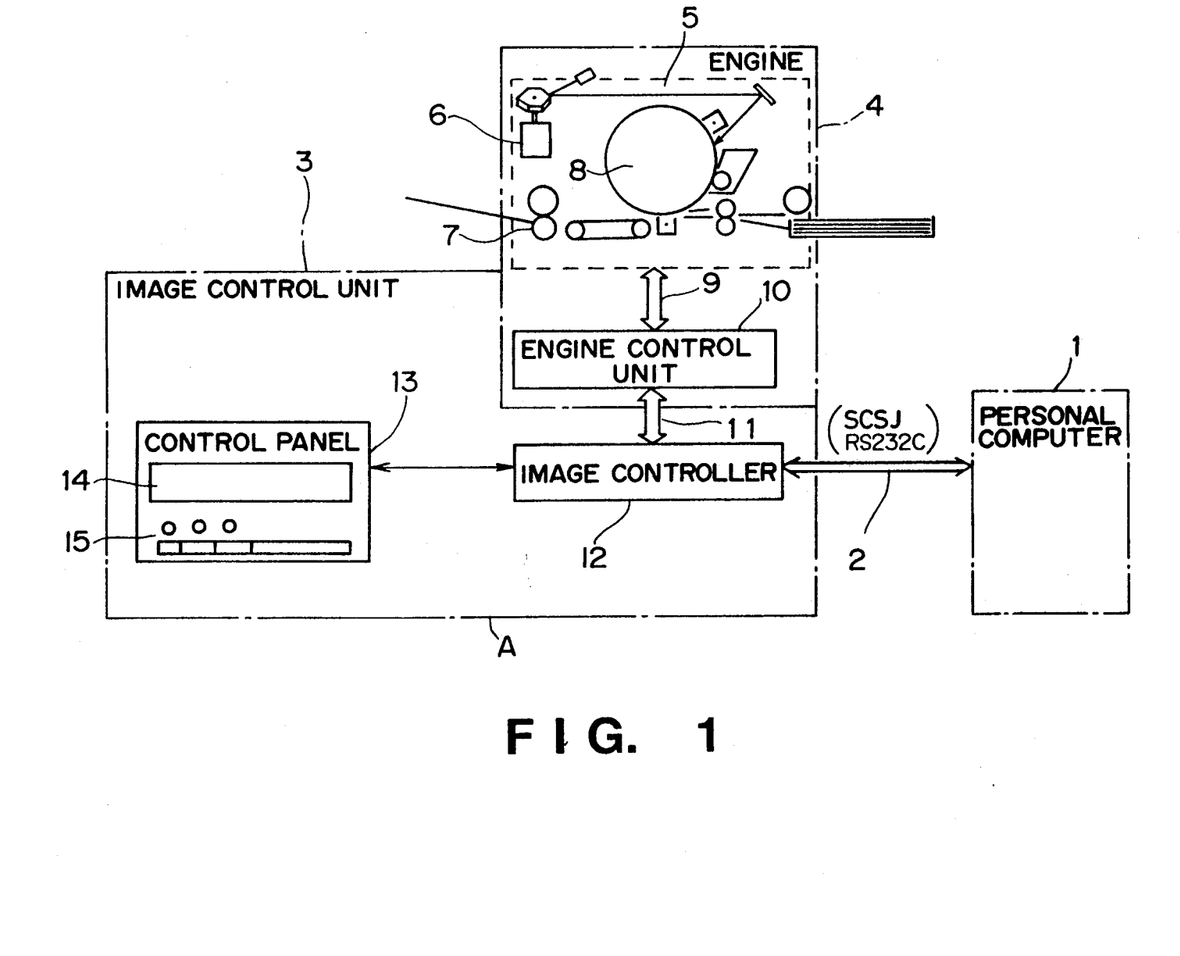
FIG. 1 is a block diagram illustrating the overall construction of a laser-beam printer according to the first embodiment of the present invention.

FIG. 1 is a block diagram illustrating the overall construction of a laser-beam printer according to an embodiment of the present invention. As shown, a personal computer 1 is connected via a communication cable 2 to an image controller 12 within a laser printer A. The communication cable 2 employs a well-known Centronics or RS232C. The laser printer A comprises an engine 4 of an electrophotographic image forming unit and an image controlling unit 3.

The image controller 12 is for developing code data, which is sent from the personal computer 1 via the interface of the communication cable 2, into a dot image. The image controller 12 is connected also to a control panel 13 having a display 14 which displays information for the operator to observe, and input keys 15. The image controller 12 judges an input from the input keys 15, executes processing in accordance with the input and delivers command signals to an engine control unit 10.

The engine control unit 10 and the image controller 12 are interconnected by a signal line 11 comprising a signal line for transmitting an engine printing starting signal and, as a video signal, the dot-image data, and a signal line for sending and receiving the prescribed command signals and status signals indicative of the status of the engine 4.

The engine control unit 10 performs image forming processing. In order to carry out the control operations in a block 5, namely control of the electrophotographic process, control of paper feed and conveyance and control of the laser drive, the engine control unit 10 sends and receives, via a signal line 9, control inputs from sensors and the like (not shown) and control outputs for driving motors and the like. Numeral 6 denotes a polygon motor, 7 a thermal fixing device, and 8 an electrophotographic photosensitive drum.

Figure 2:
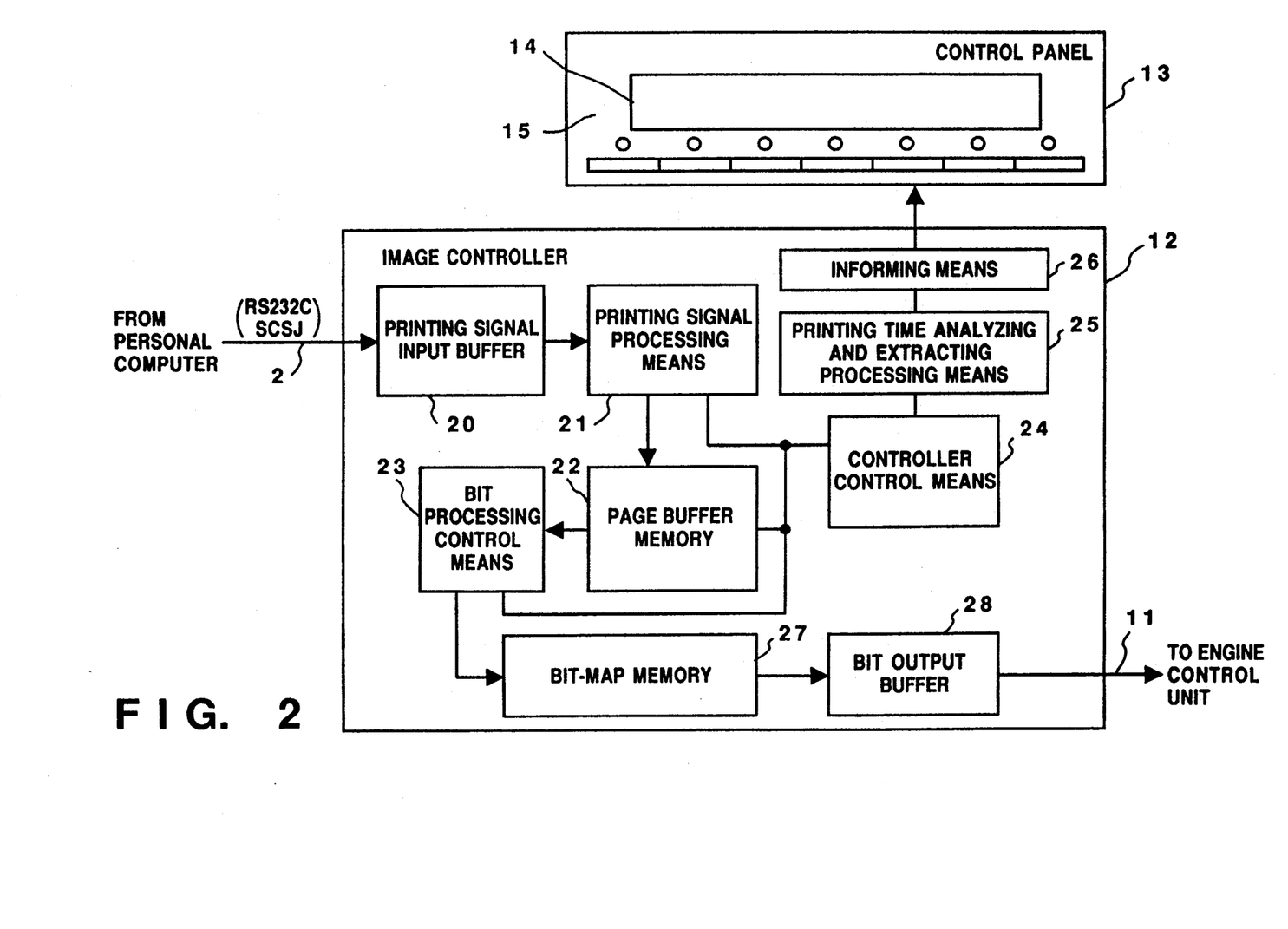
FIG. 2 is a block diagram showing the function of an image controller.

FIG. 2 is a block diagram illustrating the functions of the image controller 12. Code data sent from the personal computer 1 or the like is received as code data by a printing signal input buffer 20 and then delivered to printing signal processing means 21. The latter analyzes and decodes the received code data to generate printing data formed from an intermediate code in cooperation with controller control means (CPU) 24 and stores the printing data in a page buffer memory 22 in page units. The printing data stored in the page buffer 22 is converted into a bit-unit signal by bit processing control means 23, and the converted signal is stored in a bit-map memory 27.

The data stored in the bit-map memory 27 is transmitted as a video signal to the engine control unit 10 via a bit output buffer 28. The controller control means 24 controls the entirety of the image controller 12 and comprises a CPU, a RAM and ROM, by way of example.

In a case where the code data sent from a personal computer is analyzed, decoded and converted into bit data in the image controller 12, the printing signal processing means 21 and the bit processing control means 23 require considerable processing time. A conceivable method of raising the processing speed of the bit processing control means 23 is to make a transition from eight-bit to 16- or 32-bit processing in order to raise the CPU processing speed of the controller control means 24. However, the state of the art is such that such a CPU is high in cost and cannot be used in a low-cost printer.

In accordance with the present embodiment, therefore, printing-time analyzing and extracting means 25 is additionally provided. At the same time that the code data inputted to the printing signal processing means 21 is analyzed and decoded, the printing-time analyzing and extracting means 25 performs processing to extract the quantity of code data, the time needed to process the contents of the data and, in the form of a video signal, the time needed before a transmission can be made via the page buffer memory 22, bit processing control means 23, bit-map memory 27 and bit output buffer 28. The extracted time is displayed on the display 14 of the control panel 13 via informing means 26. The detailed operation of the printing-time analyzing means 25 is described in U.S. Ser. No. 07/770,423 filed on Oct. 3, 1991.

Figure 3:
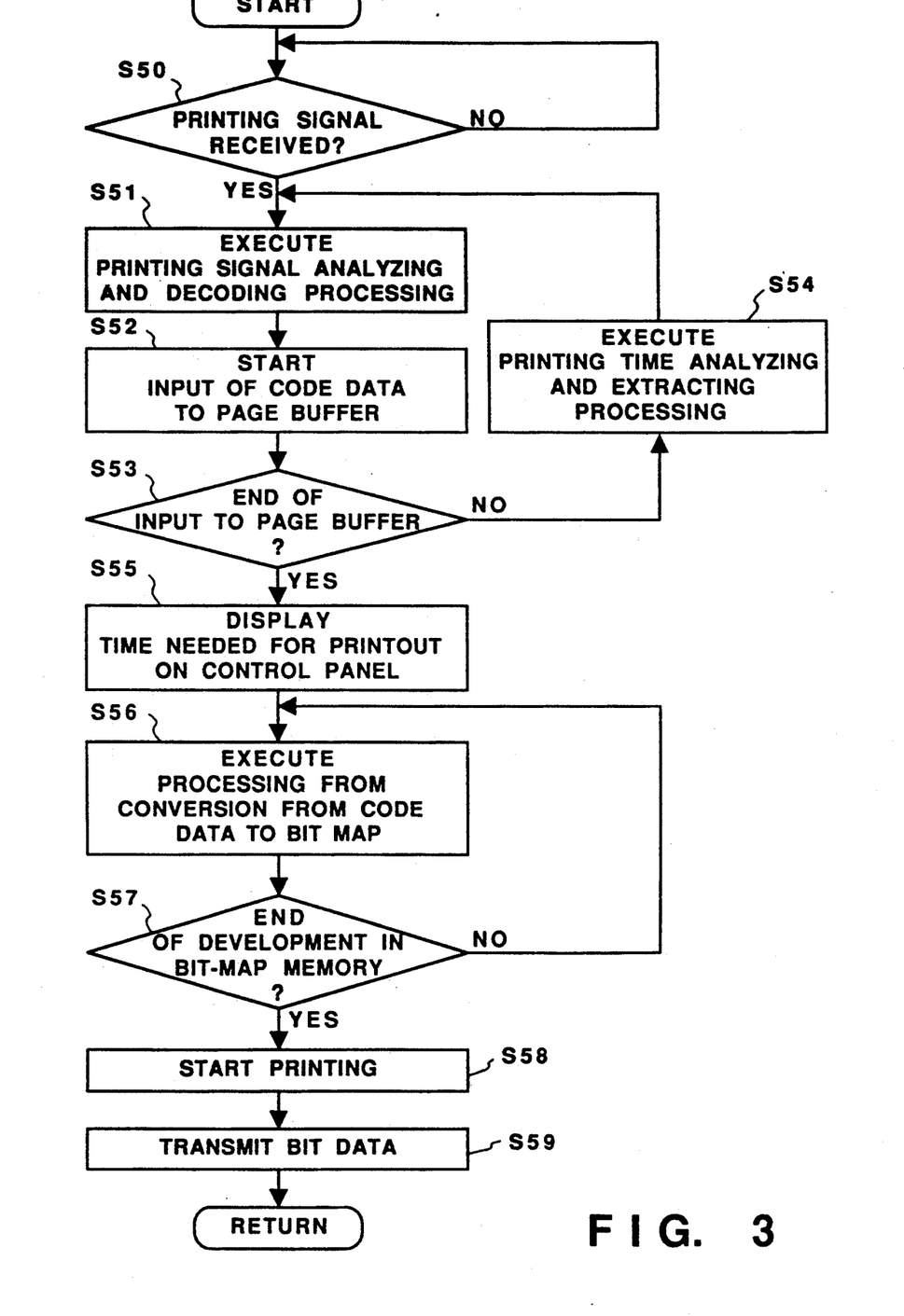
FIG. 3 is a flowchart illustrating a processing procedure according to the first embodiment.

FIG. 3 is a flowchart illustrating the processing procedure of this embodiment. At step S50 of the flowchart, it is determined whether a printing signal code data has been received. If the answer is YES, then the program proceeds to step S51, at which the processing starts for analyzing and decoding the inputted code data by the printing signal processing means 21 of FIG. 2. Next, at step S52, printing data is stored in the page buffer memory 22 in page units. This is followed by step S53, at which it is determined whether one page of the input printing data to the page buffer memory 22 has ended. If input is still in progress, the program proceeds to step S54. Here the printing time is analyzed and extracted, after which the program returns to step S51 so that the analysis and decoding of the printing signal and well as the storing of data in the page buffer may continue.

The characterizing feature of this embodiment is that, during the processing for analyzing and decoding the printing signal, printing-time analysis and extraction is performed at step S54 for analyzing and extracting the amount of code data and the time needed for processing the contents of the code data. In other words, the quantity of inputted code data, the time needed to analyze and decode the code data, and the time required for storing the code data in the page buffer memory 22 in the form of printing data are extracted, and the time needed for making the conversion from printing data to bit data is calculated based upon the amount of printing data. Furthermore, the time required for a video signal to be sent to the print engine as bit data and for an output to be obtained by the image forming means as a print image is predicted.

If the input of data to the page buffer memory 22 is determined at step S53 to have ended, the program proceeds to step S55, at which the control panel 13 is made to display the extracted time or predicted time by the aforementioned printing time analyzing and extracting processing. This is followed by step S56, at which the code data that has been stored in the page buffer memory 22 is converted into bit information, and then by step S57, at which the bit information is developed in the bit-map memory. The development of this information is continued until development ends.

When development ends at step S57, the program proceeds to step S58, at which a printing starting signal is sent to the engine control unit 10, and then to step S59, at which the bit data is sent to the engine control unit 10 as a video signal.

[Second Embodiment]

Figure 4:
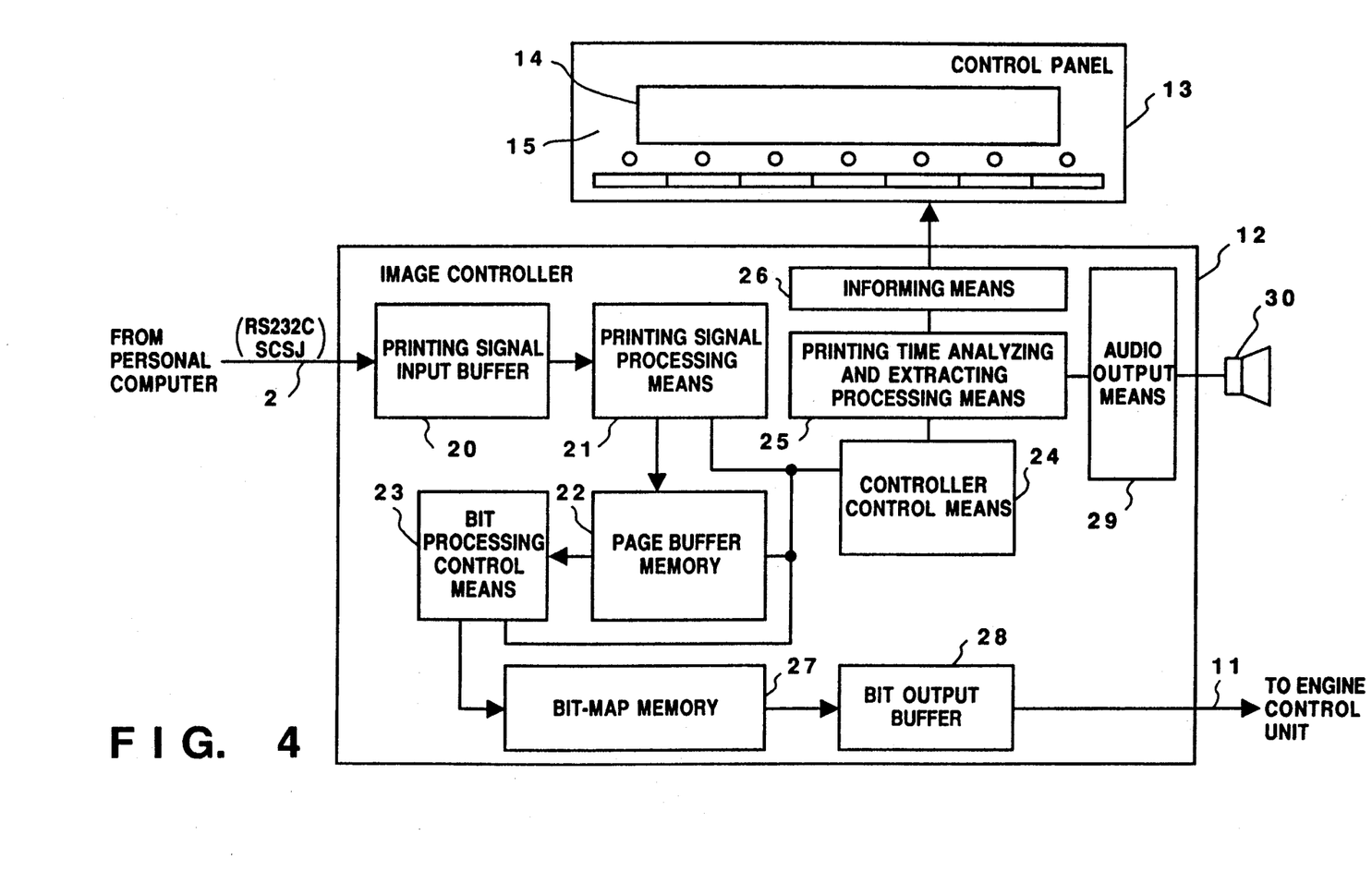
FIG. 4 is a block diagram illustrating the overall construction of a laser-beam printer according to the second embodiment of the present invention.

FIG. 4 is a block diagram showing the overall construction of the laser-beam printer according to another embodiment of the invention. This arrangement differs from that of FIG. 2 in that audio output means 29 and a speaker 30 connected to the printing time analyzing and extracting processing means 25 are provided. This makes it possible for the user to be informed, by voice, of the printing time outputted by the printing time analyzing and extracting processing means 25. An arrangement is also possible in which the user can be informed of the printing time in the form of a level display rather than a digital time display or voice track.

[Third Embodiment]

Figure 5:
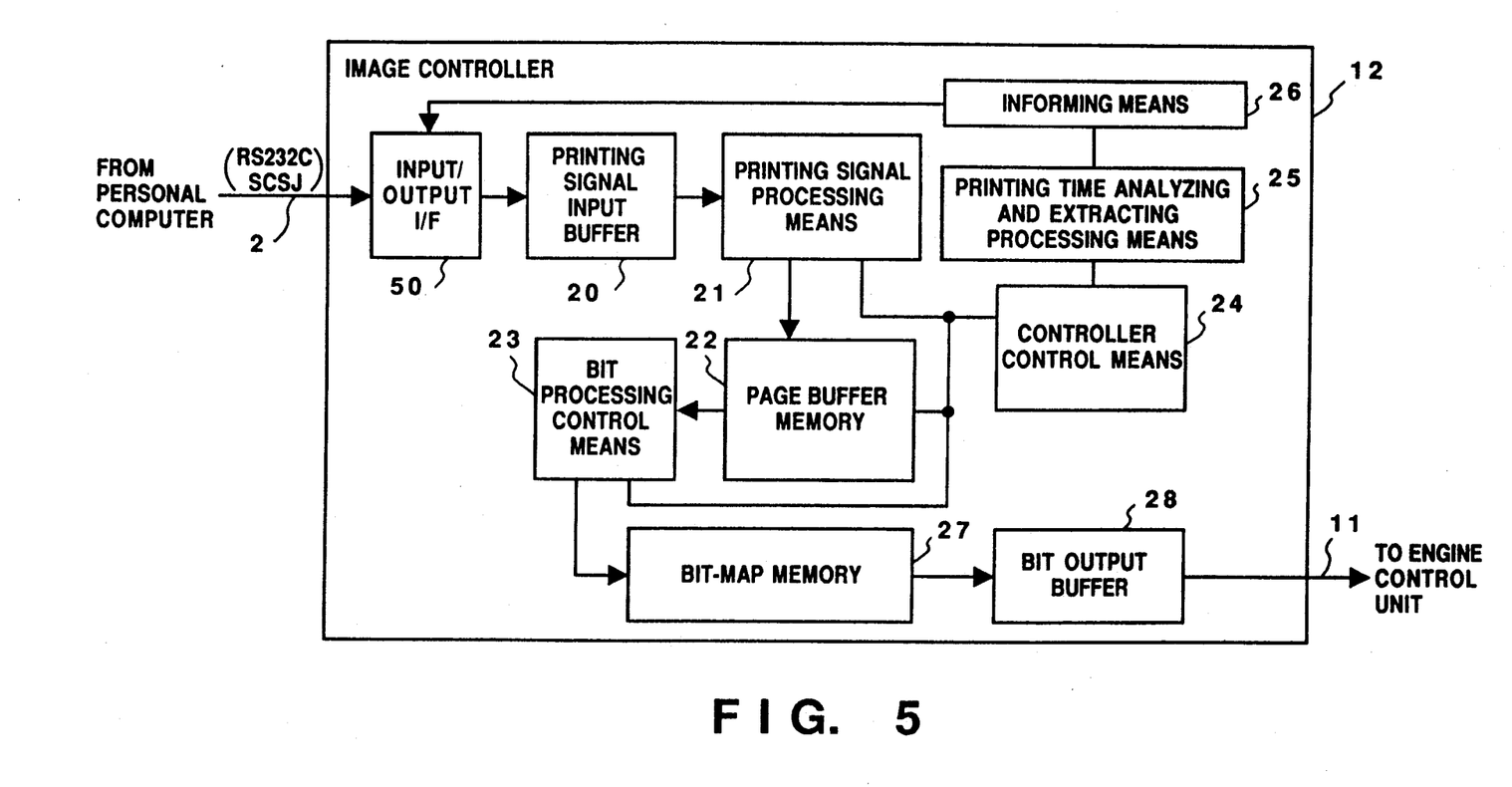
FIG. 5 is a block diagram illustrating the overall construction of a laser-beam printer according to the third embodiment of the present invention.

FIG. 5 illustrates a third embodiment of the present invention.

Figure 6:
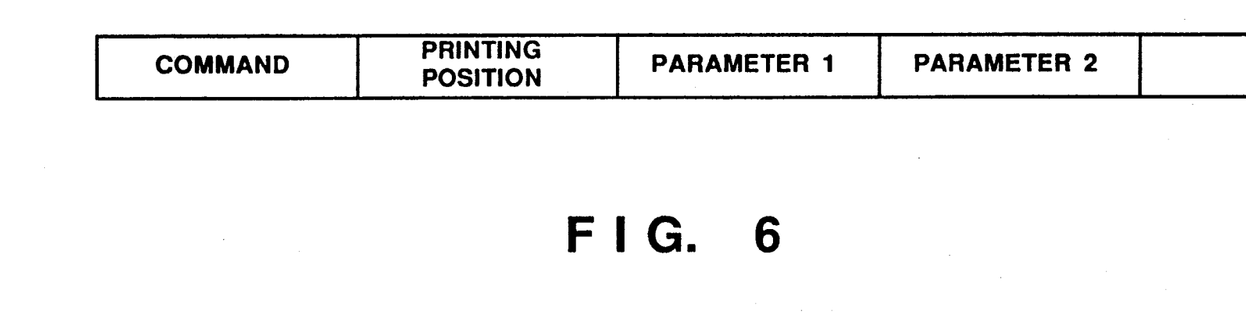
FIG. 6 is a illustration showing an example of format of code data sent from a personal computer.

The image processing apparatus according to this embodiment is connected to the personal computer 1 by an interface capable of two-way communication, such as an RS232 or SCSI. An example of the format of code data from the personal computer 1 is illustrated in FIG. 6. The printing signal processing means 21 converts such code data into an intermediate code page by page and stores the intermediate code is the page buffer 22. In parallel with the processing for the conversion to the intermediate code, printing-time analysis and extraction (prediction of the time required for developing the intermediate code into bit-map data) is carried out.

More specifically, the means for analyzing and predicting printing time has a table which stores calculation formula for deriving, in dependence upon the type of command, the development time from the parameters which follow the command. A calculation formula conforming to the type of command contained in the input code data is selected. In a case where the input code data is a so-called character code, the development time for one character is added up every single character code in dependence upon the attribute (which is designated by the above-mentioned command) of the character code. This processing is carried out every page.

Since the processing for conversion to an intermediate code and the above-mentioned processing for predicting development time is executed in concurrence with the input of code data, both of these processing operations end in a very short time. Accordingly, the individual times themselves are negligible in comparison with development time.

Though the informing means 26 may add the time needed for pre-processing by the printer engine to the development time of one page of code data, calculated as described above, and then transmit the result to an input/output I/F 50, in this embodiment the preprocessing for the printer engine is started in dependence upon the development time of one page of code data prior to the end of development.

Accordingly, at the same time that the development of one page ends, the printing operating ordinarily can be started immediately. Consequently, the informing means 26 outputs the development time of one page of code data to the input/output I/F 50 as the predicted time.

In a case where the development time is shorter than the time required for pre-processing by the printer engine, the informing means 26 outputs the time needed for pre-processing to the input/output I/F 50 as the predicted time.

The input/output I/F 50 sends the predicted time thus obtained to the personal computer 1 via an interface such as an RS232C or SCSI. The personal computer 1 displays the predicted time on a CRT while it is being decremented by an internal timer. As a result, the user is capable of ascertaining the time that will pass until printing is actually carried out.

The above-mentioned pre-processing at the printer engine refers to processing for raising the temperature of the fixing heater 7 to a prescribed value, processing for pre-rotation in the electrophotographic process, and processing for ratating the scanner motor 6 at a prescribed rotational speed.

The present invention may be applied to a system constituted by a plurality of apparatus or to a single apparatus. Further, it goes without saying that the invention is applicable also to a case where a program for implementing the invention is supplied to a system or apparatus.

According to the present invention, there is provided an image processing apparatus in which the user is informed of the time from issuance of an image-forming command to execution of the command, thereby eliminating any anxiety which the user might otherwise experience. More specifically, in a printing apparatus such as a laser printer, the time needed for code data sent from a personal computer or the like to be processed within the printing apparatus to obtain an output of a print image is displayed on a control panel or the like, thereby making it possible for the user not only to reliably confirm that the data from the personal computer has been sent to the printer but also to judge how much time will be needed for output of the print image. In particular, in the case of a complicated print image, the user need no longer wait in front of the printer for an extended period of time. Instead, upon having been informed of the time needed for printout, the user is free to engage in some other task. This is a function that is especially necessary for inexpensive printers, which have a slow printing speed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    input means for inputting coded data from an external apparatus;
    first converting means for converting the input coded data into intermediate coded data;
    second converting means for converting said intermediate coded data into bit map data;
    output means for outputting the bit map data to a printing unit;
    predicting means for predicting a prediction time needed by said second converting means for converting the intermediate coded data for one page into bit map data; and
    informing means for informing an operator of information relating to the prediction time.

2. The apparatus according to claim 1, wherein said informing means transmits the information relating to the prediction time to the external apparatus.

3. The apparatus according to claim 1, wherein said informing means includes means for displaying or announcing in a sound the information relating to the prediction time.

4. The apparatus according to claim 1, wherein said predicting means operates in parallel with said first converting means to calculate the prediction time.

5. The apparatus according to claim 1, wherein said printing unit begins preparatory operations at a timing based on the prediction time.

6. The apparatus according to claim 1, wherein the printing unit performs a printing operation comprising an electrophotographic method.

7. The apparatus according to claim 5, wherein the printing unit comprises means for fixing an image formed on a recording medium, and wherein the preparatory operations include an operation for setting said fixing means at a predetermined temperature.

8. The apparatus according to claim 5, wherein the printing unit comprises means for generating a laser beam and means for deflecting the laser beam, and wherein the preparatory operations include an operation for driving said deflection means in a predetermined state.

9. An image forming apparatus comprising:
input means for inputting coded data from an external apparatus;
first converting means for converting the input coded data into intermediate coded data;
second converting means for converting said intermediate coded data into bit map data;
a printing unit for printing an image in accordance with the bit map data;
predicting means for predicting a prediction time needed by said second converting means for converting the intermediate coded data for one page into bit map data; and
informing means for informing an operator of information relating to the prediction time.

10. The apparatus according to claim 9, wherein said informing means transmits the information relating to the prediction time to the external apparatus.

11. The apparatus according to claim 9, wherein said informing means includes means for displaying or announcing in a sound the information relating to the prediction time.

12. The apparatus according to claim 9, wherein said predicting means operates in parallel with said first converting means to calculate the prediction time.

13. The apparatus according to claim 9, wherein said printing unit begins preparatory operations at a timing based on the prediction time.

14. The apparatus according to claim 9, wherein the printing unit performs a printing operation comprising an electrophotographic method.

15. The apparatus according to claim 13, wherein the printing unit comprises means for fixing an image formed on a recording medium, and wherein the preparatory operations include an operation for setting said fixing means at a predetermined temperature.

16. The apparatus according to claim 13, wherein the printing unit comprises means for generating a laser beam and means for deflecting the laser beam, and wherein the preparatory operations include an operation for driving said deflection means in a predetermined state.

17. An image processing method comprising the steps of:
inputting coded data from an external apparatus;
developing the coded data into bit map data;
predicting a prediction time needed for developing the coded data for one page into bit map data; and
informing an operator of information relating to the prediction time,
wherein said developing step comprises a first converting step for converting the input coded data into intermediate coded data, and a second converting step for converting said intermediate coded data into bit map data, and wherein in said predicting step, a time needed for the conversion in said second converting step is calculated as the prediction time.

18. The method according to claim 17, further comprising a step for printing an image in accordance with the bit map data, wherein preparatory operations for the printing step are started at a timing based on the prediction time.

* * * * *